United States Patent [19]

Larsen

[11] Patent Number: 4,899,650

[45] Date of Patent: Feb. 13, 1990

[54] MACHINE FOR LAYERING SHEETS OF FOOD MATERIAL

[75] Inventor: Hans K. Larsen, Aestorp, Sweden

[73] Assignee: Nestec S.A., Vevey, Switzerland

[21] Appl. No.: 282,123

[22] Filed: Dec. 9, 1988

[30] Foreign Application Priority Data

Jan. 8, 1988 [EP] European Pat. Off. ........ 88100143.2

[51] Int. Cl.⁴ .......................... A23L 1/16; A23P 1/00
[52] U.S. Cl. .................................... 99/450.2; 99/353; 99/450.6; 99/450.7
[58] Field of Search .............. 99/352, 353, 355, 450.1, 99/450.2–450.6, 450.7; 426/275, 496, 502, 516, 517, 144; 425/133.1, 425

[56] References Cited

U.S. PATENT DOCUMENTS

| | | | |
|---|---|---|---|
| 3,793,938 | 2/1974 | Haas | 99/450.6 |
| 3,804,637 | 4/1974 | Rejsa | 99/450.1 |
| 4,418,085 | 11/1983 | Becquelet | 426/502 |
| 4,679,496 | 7/1987 | Simelunas et al. | 99/450.2 |
| 4,697,507 | 10/1987 | Nagasaki | 99/483 |
| 4,698,000 | 10/1987 | Thulin et al. | 425/133.1 |
| 4,711,165 | 12/1987 | Codino | 99/353 |

*Primary Examiner*—Timothy F. Simone
*Attorney, Agent, or Firm*—Vogt & O'Donnell

[57] ABSTRACT

A machine for layering sheets of food material has a conveyor belt for conveying a plurality of sheets of flexible food material lying flat and parallel to one another on the conveyor belt and at least one substantially stationary spiral guide positioned above the conveyor belt. Each spiral guide has a longitudinal axis which is substantially horizontal and at an oblique angle to a downstream direction of flow of the sheets of food material on the conveyor belt and is positioned to enable a sheet of the flexible food material to pass beneath it and then to be guided at least one complete turn around it so that the guided sheet comes to lie above another sheet advancing downstream on the conveyor belt.

10 Claims, 5 Drawing Sheets

MACHINE FOR LAYERING SHEETS OF FOOD MATERIAL

BACKGROUND OF THE INVENTION

The present invention relates to a machine and method for layering sheets of food material, more particularly to forming sheets of lasagne in layers, inserting a filling between the layers and cutting into portions automatically.

Normally, in the production of lasagne, the pasta is extruded, cut into sheets of a suitable width, blanched, cut and put piece by piece into an ALUTRAY device, by hand with a filling of sauce between the pieces. This process has the following disadvantages:
(1) The pasta processing line is unduly long and occupies a great deal of space.
(2) The process is labour intensive and requires at least five people on the line.
(3) There are losses of pasta as a result of a lack of time for the operator to transport all the pieces of pasta to the ALUTRAY device.
(4) There are several moving parts in the machine for transporting and layering the pasta sheets, which are prone to break down or wear out.

SUMMARY OF THE INVENTION

A machine which occupies less than half the length of a conventional machine, is labour saving, has no moving parts except for the basic conveyor which reduces or eliminates the costs for exchange of machine parts and possible shut-downs and substantially prevents any losses in pasta has been developed.

Accordingly, the present invention provides a machine for layering sheets of food material comprising a conveyor belt adapted to convey a plurality of thin sheets of flexible food material lying flat and parallel to one another, power means connected to the conveyor to advance the sheets of food material downstream and at least one substantially stationary spiral guide positioned above the conveyor belt with its longitudinal axis substantially horizontal and at an oblique angle to the direction of flow of the food material, adapted to enable a respective sheet of flexible food material to pass beneath it and then to be guided at least one complete turn around it so that the said sheet comes to lie above another sheet advancing downstream.

By "substantially stationary" we mean that the spiral guide should not rotate around its own axis but that the angle between the guide and the direction of flow of the food material may be slightly adjustable.

DETAILED DESCRIPTION OF THE INVENTION

In the present invention the conveyor conveniently travels at a speed of from 1 to 10 meters/min and preferably from 3 to 7 meters/min.

The length of the spiral guide is preferably such that it extends from the original advancing position to the final advancing position of the sheet that it guides preferably in one complete turn (360°) or two complete turns (720°).

The oblique angle of the longitudinal axis of the spiral guide to the direction of flow of the food material should be greater than 0° and less than 90° and is usually within the range of from 25° to 75°, preferably from 30° to 60°.

The lower part of the spiral guide is conveniently positioned at a height above the conveyor so that it is as near as possible to the conveyor but without touching the sheet of food material that it has guided to its new position on the conveyor. The more downstream guides are therefore advantageously positioned at a greater height above the conveyor. The distance between the spiral guide and the conveyor is preferably adjustable and the ideal distance is substantially equal to the sum of the thicknesses of the sheets of food material (and fillings, if present) which are to pass beneath the respective guide.

When there is more than one spiral guide, the guides may be positioned successively along the conveyor belt each guide being adapted to guide a sheet of food material one complete turn around it, for instance, to form a layer lying above the layer guided by the immediately preceding upstream guide so that the most downstream guide guides the sheet of food material which will form the upper layer of the product.

Although the number of spiral guides may correspond to the number of sheets of food material which are transported on the conveyor belt to form the layered product, advantageously there is one less spiral guide than the number of sheets. This is because the sheet which forms the bottom sheet of the layered product may advance along the conveyor belt in contact with it without needing to be guided to a new position by a spiral guide.

Conveniently, the spiral guide is positioned on a guide means, such as a cylindrical tube whose axis is substantially horizontal. If desired, the spiral guide may consist of small guide heads interspaced in a spiral direction around the guide means. However, advantageously, the spiral guide is provided by means of a guiding list around the circumference of a cylinder forming a spiral groove with a fixed pitch enabling the sheet of food material to be guided from one position on the conveyor belt around and in contact with the groove between the guiding lists so that it comes to lie above another sheet at another position on the conveyor belt. The groove does not necessarily have to make a complete turn around the cylindrical tube but should be present at least at the take-up and release points of the sheet of food material where it may cover a distance of 30° and preferably at least 45°.

The steepness of the spiral of the guiding list depends on the lateral distance to be covered by the sheet of food material as it is guided to its new position, and on the angle of the longitudinal axis of the cylindrical tube to the direction of flow of the food material. The width of the pitch should be equal or slightly wider than the width of the sheet of food material so that it is adapted to enable the sheet of food material to be guided around the groove by the guiding list in a suitable manner. With this width as a basis, the width of the pitch may vary according to the angle of the longitudinal axis of the cylindrical tube to the direction of flow of the food material and to the lateral distance to be covered by the sheet of food material as it is guided to its new position.

Preferably, the cylindrical tube is double-walled and provided with a liquid inlet in the outer wall which is provided with one or more apertures to enable a food-compatible lubricant liquid to flow through the inlet, between the walls and through the apertures onto the outer surface into the groove formed by the guiding list to build up a thin film between the groove and the sheet of food material. A suitable lubricant liquid is water or possibly a low viscous component of a sauce filling or even the sauce itself.

When a filling is desired between the layers of product, at least one nozzle is suitably positioned upstream of at least one spiral guide to feed a certain amount of filling onto each sheet, except the upper one, before another sheet is guided to lie above it. Alternatively, a sauce filling may be pressed out through the apertures of the cylindrical tube to build up a film between the groove and the sheet of food material.

Desirably, a feed conveyor which may be vertically adjustable, is mounted downstream of the downstream guide, at a position just above where the upper layer of the food material will be guided, which is adapted to press the food material to the desired thickness and to propel it downstream.

Conveniently, a cutting means adapted to cut the layered food material into predetermined lengths is positioned above the conveyor belt at the downstream end. The cutting means may advantageously be a guillotine knife and is preferably adapted to reciprocate so that it may advance at the same speed as the layered food material during the cutting operation in order to prevent the food material stopping.

Preferably, a shuttle conveyor is positioned just beyond the downstream end of the conveyor belt, by means of which the layered food product, after being cut, is conveniently transferred from the belt to a package such as an ALUTRAY device.

The present invention also provides a method of layering sheets of food material characterised in that a plurality of thin sheets of flexible food material lying flat and parallel to one another advance on a conveyor belt, at least one of the sheets passes beneath and one complete turn around a respective substantially stationary spiral guide positioned above the conveyor belt with its longitudinal axis substantially horizontal and at an oblique angle to the direction of flow of the food material so that one sheet comes to lie above another sheet advancing downstream.

Advantageously, the sheet which will form the bottom sheet of the layered food material, advances along the conveyor belt in contact with it without passing around a stationary spiral guide.

The number of sheets of flexible food material lying on the conveyor belt may vary depending on how many layers are desired. For instance, in the preparation of a lasagne, from 3 to 6 sheets may be used but a larger number of sheets may be used for some products e.g. up to 11. In the production of a lasagne, for example, a filling is inserted between the layers of product by feeding the filling onto each sheet except the upper one before another sheet has been guided to lie above it. The thickness of the sheet of food material may vary, for instance from 0.5 mm to 5 mm.

The apparatus and process of the present invention are especially suitable for slippery products such as sheets of pasta which have been extruded, blanched, cut into thin sheets and then cooled in water. In order to prevent the surface of the sheets from becoming sticky as a result of drying out, the surface of the sheets should be kept moist throughout the entire process during which the product is very slippery. For example, in a preferred embodiment of the present invention, the spiral guide is provided with a guiding list around the circumference of a cylindrical tube, forming a groove with a fixed pitch. The cylinder is advantageously double-walled and is provided with a liquid inlet and one or more apertures in the outer wall, and a lubricant liquid such as water flows through the inlet, between the walls, and through the apertures in the outer wall onto the outer surface of the groove to build up a thin lubricating film between the guide and the sheet of food material as it is being guided around.

The process of the present invention proceeds automatically with only one person being required at the starting-up of the line to guide the sheets of food material around the respective cylindrical guides.

The present invention is illustrated by way of example with reference to the following drawings.

DETAILED DESCRIPTION OF THE DRAWINGS

Figure 1:
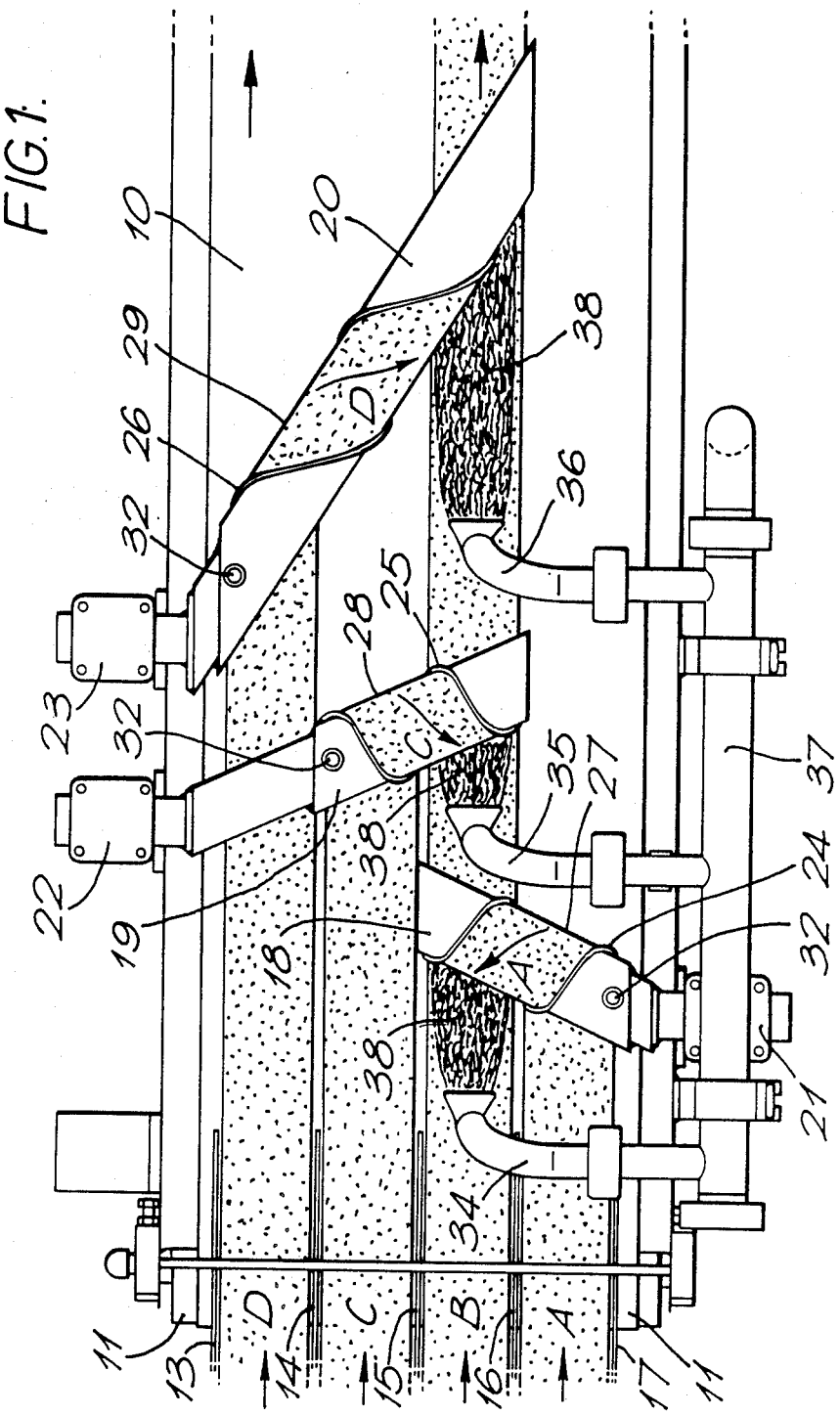
FIG. 1 represents a diagrammatic top plan view of the machine according to the invention for making a lasagne from 4 sheets of pasta.
Figure 2:
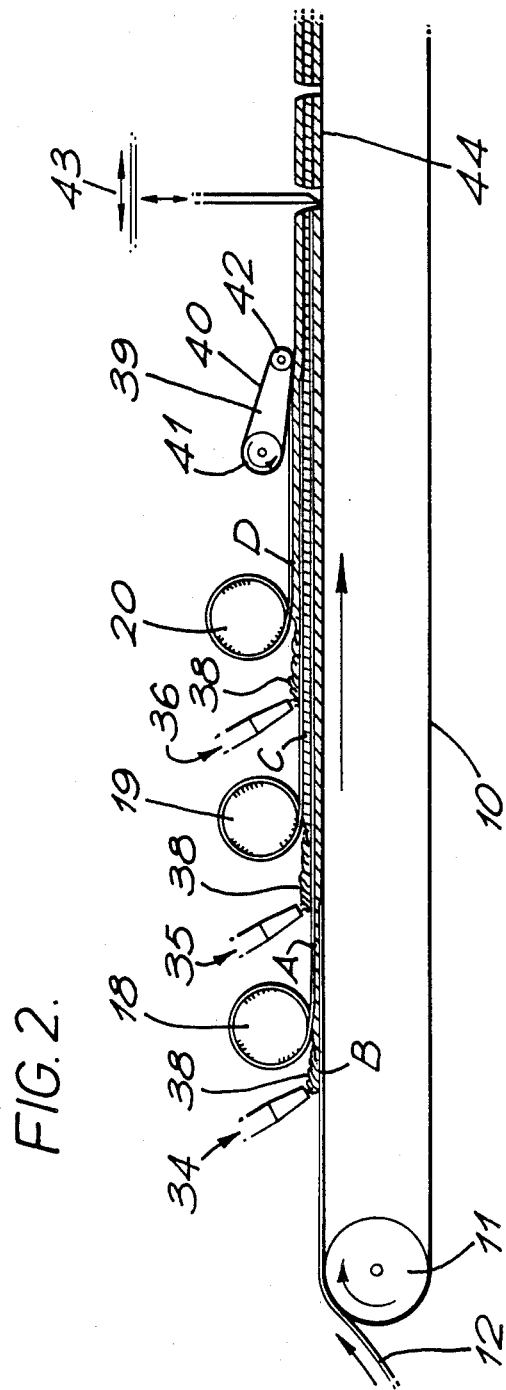
FIG. 2 represents a diagrammatic sectional side view of the machine of FIG. 1.
Figure 3:
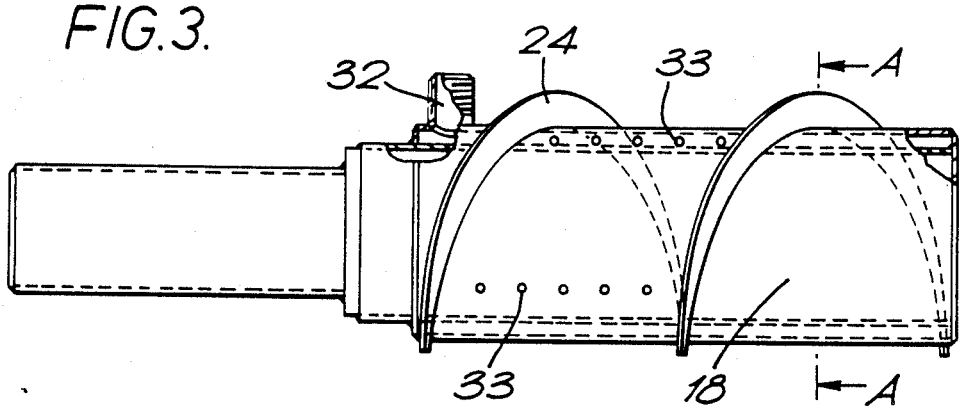
FIG. 3 is a diagrammatic side view of spiral guide 18 in FIG. 1.
Figure 4:
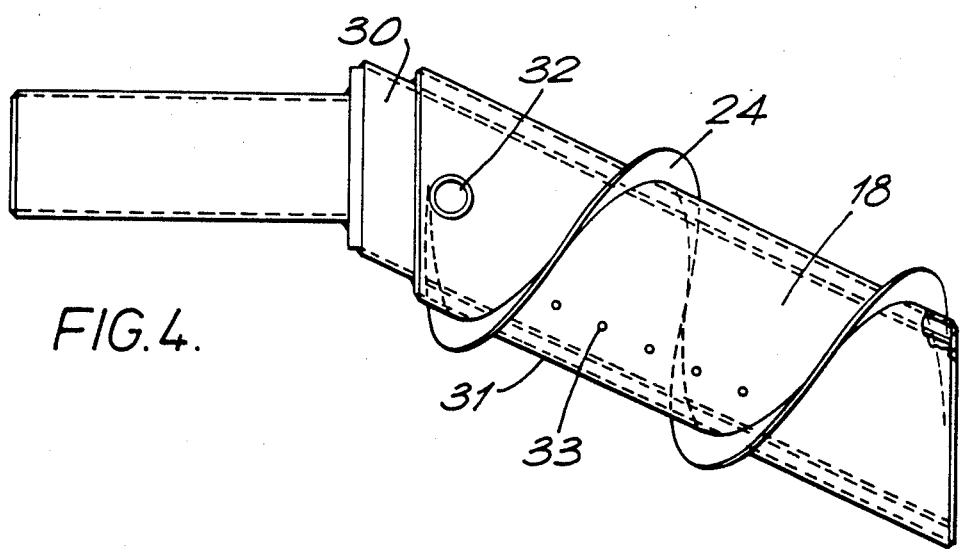
FIG. 4 is a diagrammatic top plan view of the spiral guide of FIG. 3.
Figure 5:
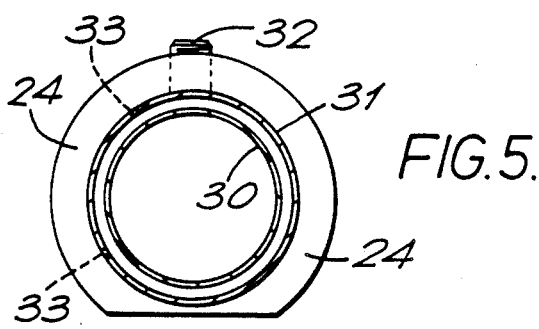
FIG. 5 is a sectional view of a spiral guide looking in the direction of the arrows A—A of FIG. 3.

Referring to FIGS. 1-5 of the drawings, the machine comprises a conveyor belt 10 driven by roller 11 in the direction indicated by the arrows. Pasta material 12 is fed onto the conveyor belt 10 in the form of four thin sheets A,B, C and D which are guided by guide plates 13,14,15,16 and 17 while travelling in the direction of the arrows. Positioned above the conveyor belt are double-walled cylindrical guide tubes 18,19 and 20 fixed to holders 21,22 and 23 respectively and provided with guiding lists 24,25 and 26 respectively forming grooves 27,28 and 29 respectively. Each cylinder has an inner wall 30, an outer wall 31 and is provided with a liquid inlet 32 and apertures 33 in the outer wall of the area of the grooves for liquid outlet. Positioned above pasta sheet B are sauce nozzles 34,35 and 36 attached to a sauce container 37 which supplies sauce 38 by means of pump (not shown). Positioned downstream of the cylindrical guide tube 20 is a vertically adjustable feed conveyor 39 comprising an endless belt 40 trained about rollers 41,42 and a reciprocating guillotine knife 43. The portioned lasagne product is indicated by numeral 44.

In operation, the four sheets of moist pasta material A,B,C and D which have been obtained by extrusion, blanching, cutting and cooling in a water basin are fed onto the conveyor belt 10 where they are transported at a speed of 5 metres/min in the direction of the arrows. Sauce 38 is continuously pumped from nozzle 34 onto sheet B. Water flows through the inlets 32 between the walls of the guide tubes 18,19 and 20 and through the apertures 33 onto the external surface of the grooves 27,28 and 29 respectively.

At the start of the process, one operator guides the pasta sheets A, C and D around the guide tubes 18, 19 and 20 into the grooves 27, 28 and 29 so that they come to lie in successive layers above pasta sheet B which forms the bottom sheet of the product. Once the pasta sheets have been initially guided over the guide tubes by the operator they continue to follow the guiding path aided by the water flowing through the apertures 33 forming a thin lubricating film between the external surfaces of the grooves 27, 28 and 29 and the respective pasta sheets.

Pasta sheet A is guided around guiding groove 27 to lie immediately above sheet B separated by the sauce filling 38 from nozzle 34 and sauce from nozzle 35 is continuously pumped onto sheet A. Pasta sheet C is guided around groove 28 to lie immediately above sheet A separated by the sauce filling from nozzle 35 while sauce from nozzle 36 is continuously pumped onto sheet C. Pasta sheet D is guided around groove 29 to form the top sheet lying immediately above sheet C separated by the sauce filling from nozzle 36. The layered lasagne continues to advance downstream and passes beneath the feed conveyor 39 by which it is pressed to the desired thickness and by which it is urged downstream to the guillotine knife 43 where it is cut into predetermined lengths. During the cutting operation the guillotine advances at the same speed as the lasagne in order to ensure that the lasagne does not stop and after cutting the knife rises and the guillotine returns upstream to commence another cutting operation.

After being cut into portions, the lasagne is transferred to a shuttle conveyor and packed in to ALU-TRAYS.

Figure 6:
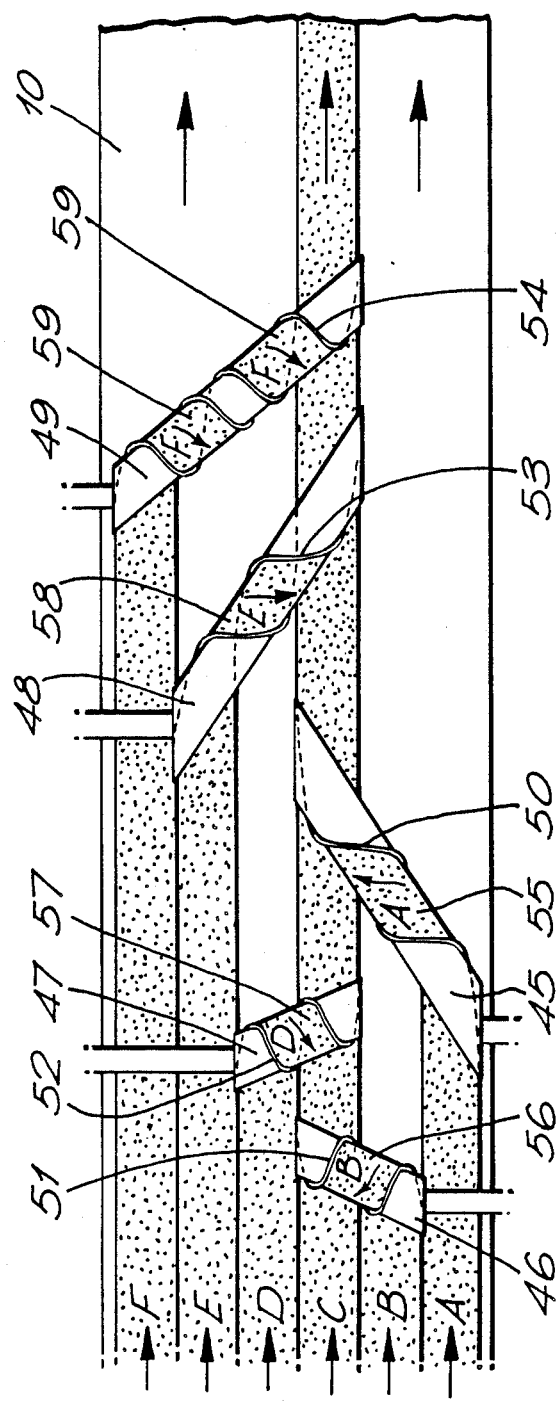
FIG. 6 is a top plan view of a machine of the present invention for making a lasagne from 6 sheets of pasta using 5 spiral guides.

Referring to FIG. 6 of the drawings, a conveyor belt 10 is driven in the direction indicated by the arrows. The pasta material is fed onto the conveyor belt in the form of six thin sheets A,B,C,D,E and F which travel at 4 metres/min in the direction of the arrows. Positioned above the conveyor belt are five double-walled cylindrical guide tubes 45,46,47,48 and 49 provided with guiding lists 50,51,52,53 and 54 respectively forming grooves 55,56,57,58 and 59 respectively.

In operation, at the start of the process one operator guides the pasta sheets B,D,A and E one complete turn around the guide tubes 46,47,45 and 48 into the grooves 56,57,55 and 58 so that they come to lie in successive layers above pasta sheet C which forms the bottom sheet of the product. The operator also guides pasta sheet F two complete turns around the groove 59 of guide tube 99 so that sheet F becomes the top layer. Once the pasta sheets have been initially guided over the guide tubes by the operator they continue to follow the guiding path aided by the water flowing through apertures in the outer walls of the cylinders as described in the embodiment of FIGS. 1 to 5. A sauce filling is supplied between the layers of pasta in a similar manner to that described in the embodiment of FIGS. 1 to 5.

Pasta sheet B is guided around groove 56 to lie immediately above sheet C, pasta sheet D is guided around groove 57 to lie immediately above sheet B, pasta sheet A is guided around groove 55 to lie immediately above sheet D, pasta sheet E is guided around groove 58 to lie immediately above pasta sheet A while pasta sheet F is guided around groove 59, two complete turns around the cylindrical guide tube to come to lie immediately above pasta sheet E and form the top layer of the lasagne. The layered lasagne continues to advance downstream as described in the embodiment of FIGS. 1 to 5.

Figure 7:
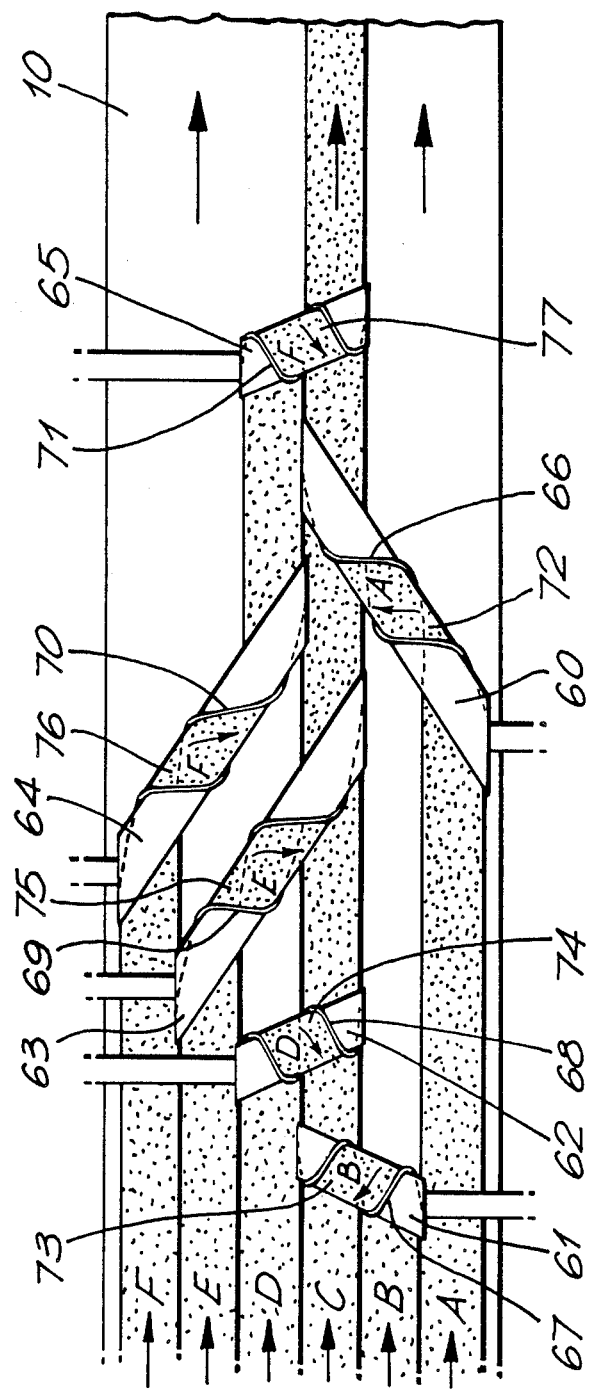
FIG. 7 is a top plan view of a machine of the present invention for making a lasagne from 6 sheets of pasta using 6 spiral guides.

Referring to FIG. 7 of the drawings, a conveyor belt 10 is driven in the direction indicated by the arrows. The pasta material is fed onto the conveyor belt in the form of six thin sheets A,B,C,D,E and F which travel at 6 metres/min in the direction of the arrows. Positioned above the conveyor belt are six double-walled cylindrical tubes 60,61,62,63,64, and 65 provided with guiding lists 66,67,68,69,70 and 71 respectively forming grooves 72,73,74,75,76 and 77 respectively.

In operation, at the start of the process one operator guides the pasta sheets B,D,E and A one complete turn around the guide tubes 61,62,63 and 60 into the grooves 73,74,75 and 72 so that they come to lie in successive layers above pasta sheet C which forms the bottom sheet of the product. The operator also guides pasta sheet F one complete turn around groove 76 of guide tube 64 and then one complete turn around groove 77 of guide tube 65 so that sheet F becomes the top layer. Once the pasta sheets have been initially guided over the guide tubes by the operator, they continue to follow the guiding path aided by the water flowing through apertures in the outer walls of the cylinders as described in the embodiment of FIGS. 1 to 5. A sauce filling is supplied between the layers of pasta in a similar manner to that described in the embodiment of FIGS. 1 to 5.

Pasta sheet B is guided around groove 73 to lie immediately above sheet C, pasta sheet D is guided around groove 74 to lie immediately above sheet B, pasta sheet E is guided around groove 75 to lie immediately above sheet D, pasta sheet A is guided around groove 72 to lie immediately above sheet E, while pasta sheet F is guided firstly around groove 76 and then around groove 77 to come to lie immediately above pasta sheet A and form the top layer of the lasagne. The layered lasagne continues to advance downstream as described in the embodiment of FIGS. 1 to 5.

I claim:

1. (Amended) A machine for layering sheets of food material comprising *a conveyor having* a conveyor belt to convey a plurality of sheets of flexible food material lying flat and parallel to one another, power means connected to the conveyor to advance *the conveyor belt and* the sheets *in a* downstream *direction of flow* and at least one substantially stationary spiral guide positioned above the conveyor belt, *each such guide being positioned to have a longitudinal axis substantially horizontal and at an oblique angle to the downstream direction of flow of the sheets and* [food material, adapted] to enable a sheet to pass beneath it and [then] to be guided at least one complete turn around it so that the *guided* sheet comes to lie above another sheet *of the plurality of sheets* advancing *in the* downstream *direction of flow on the conveyor belt thereby forming layered sheets of food material.*

2. (Amended) A machine according to claim 1 *wherein* when there is more than one spiral guide, *each guide is* positioned successively *above* [along] the conveyor belt.

3. (Amended) A machine according to claim 1 *wherein* the angle of the longitudinal axis of *each* spiral guide to the *downstream* direction of flow is form 25° to 75°.

4. (Amended) A machine according to claim 1*wherein each* spiral guide is *a cylinder having around its circumference* a guiding list *which forms* a spiral groove with a fixed pitch.

5. (Amended) A machine according to claim 4 *wherein* the cylinder is double walled *and has an* outer wall provided with a liquid inlet and *has at least* one *aperture* in the *spiral* groove.

6. (Amended) A machine according to claim 1 *wherein* the number of spiral guides is one less than the number of sheets *conveyed* on the conveyor belt.

7. (Amended) A machine according to claim 1 *further comprising* at least one nozzle positioned upstream of at least one spiral guide to provide a filling onto *a* sheet *onto which* another sheet is guided *by each such spiral guide.*

8. (Amended) A machine according to claim 1 *further comprising* a vertically adjustable feed conveyor *positioned* downstream of *a most* downstream *spiral* guide above the *conveyor belt to press the layered sheets* of food material *advancing from the most downstream spiral guide.*

9. (Amended) A machine according to claim 1 *further comprising* a cutting means positioned above the conveyor belt downstream *of a most downstream spiral guide to cut the layered sheets of food material advancing from the most downstream spiral guide into predetermined lengths.*

10. (Amended) A machine according to claim 9 *wherein* the cutting means is a *reciprocal* guillotine knife.

stream of a most downstream spiral guide above the conveyor belt to press the layered sheets of food material advancing from the most downstream spiral guide.

9. A machine according to claim 1 further comprising a cutting means positioned above the conveyor belt downstream of a most downstream spiral guide to cut the layered sheets of food material advancing from the most downstream spiral guide into predetermined lengths.

10. A machine according to claim 9 characterized the cutting means is a reciprocale guillotine knife.

* * * * *

UNITED STATES PATENT AND TRADEMARK OFFICE
CERTIFICATE OF CORRECTION

PATENT NO. : 4,899,650
DATED : February 13, 1990
INVENTOR(S) : Hans K. LARSEN

It is certified that error appears in the above-identified patent and that said Letters Patent is hereby corrected as shown below:

Column 3, line 4, insert a comma between "conveyor" and "which".

Column 4, line 9, delete the semicolon, and insert a period.

Column 4, line 20, delete ", and" and insert a period.

Column 5, line 19, "ALUTRAYS" should be --ALUTRAY devices.--

Column 5, line 35, "99" should be --49--.

Delete Column 6, lines 21 through 69, and insert the following:

--1. A machine for layering sheets of food material comprising a conveyor having a conveyor belt to convey a plurality of sheets of flexible food material lying flat and parallel to one another, power means connected to the conveyor to advance the conveyor belt and the sheets in a downstream direction of flow and at least one substantially stationary spiral guide positioned above the conveyor belt, each such guide being positioned to have a longitudinal axis substantially horizontal and at an oblique angle to the downstream direction of flow of the sheets and to enable a sheet to pass beneath it and to be guided at least one complete turn around it so that the guided sheet comes to lie above another sheet of the plurality of sheets advancing in the downstream direction of flow on the conveyor belt thereby forming layered sheets of food material.--

UNITED STATES PATENT AND TRADEMARK OFFICE
CERTIFICATE OF CORRECTION

PATENT NO. : 4,899,650

DATED : February 13, 1990

INVENTOR(S) : Hans K. LARSEN

It is certified that error appears in the above-identified patent and that said Letters Patent is hereby corrected as shown below:

--2. A machine according to claim 1 wherein when there is more than one spiral guide, each guide is positioned successively above the conveyor belt.--

--3. A machine according to claim 1 wherein the angle of the longitudinal axis of each spiral guide to the downstream direction of flow is from 25° to 75°.--

--4. A machine according to claim 1 wherein each spiral guide is a cylinder having around its circumference a guiding list which forms a spiral groove with a fixed pitch.--

--5. A machine according to claim 4 wherein the cylinder is double walled and has an outer wall provided with a liquid inlet and has at least one aperture in the spiral groove.--

--6. A machine according to claim 1 wherein the number of spiral guides is one less than the number of sheets conveyed on the conveyor belt.--

--7. A machine according to claim 1 further comprising at least one nozzle positioned upstream of at least one spiral guide to provide a filling onto a sheet onto which another sheet is guided by each such spiral guide.--

UNITED STATES PATENT AND TRADEMARK OFFICE
CERTIFICATE OF CORRECTION

PATENT NO. : 4,899,650

DATED : February 13, 1990

INVENTOR(S) : Hans K. LARSEN

It is certified that error appears in the above-identified patent and that said Letters Patent is hereby corrected as shown below:

--8. A machine according to claim 1 further comprising a vertically adjustable feed conveyor positioned downstream of a most downstream spiral guide above the conveyor belt to press the layered sheets of food material advancing from the most downstream spiral guide.--

--9. A machine according to claim 1 further comprising a cutting means positioned above the conveyor belt downstream of a most downstream spiral guide to cut the layered sheets of food material advancing from the most downstream spiral guide into predetermined lengths.--

--10. A machine according to claim 9 wherein the cutting means is a reciprocale guillotine knife.--

Delete Column 7, lines 1 through 23 since Remarks are not printed in a patent.

Signed and Sealed this

Thirteenth Day of August, 1991

*Attest:*

HARRY F. MANBECK, JR.

*Attesting Officer*    *Commissioner of Patents and Trademarks*